United States Patent
Dao et al.

(10) Patent No.: US 10,320,930 B2
(45) Date of Patent: Jun. 11, 2019

(54) METHOD AND SYSTEM FOR PROVIDING NETWORK CACHES

(71) Applicants: Ngoc-Dung Dao, Ottawa (CA); Hamidreza Farmanbar, Ottawa (CA); Xu Li, Nepean, CA (US)

(72) Inventors: Ngoc-Dung Dao, Ottawa (CA); Hamidreza Farmanbar, Ottawa (CA); Xu Li, Nepean, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 112 days.

(21) Appl. No.: 14/928,165

(22) Filed: Oct. 30, 2015

(65) Prior Publication Data
US 2017/0126832 A1    May 4, 2017

(51) Int. Cl.
*H04L 12/26*  (2006.01)
*H04L 29/08*  (2006.01)

(52) U.S. Cl.
CPC .......... *H04L 67/2842* (2013.01); *H04L 43/16* (2013.01); *H04L 67/10* (2013.01); *H04L 43/0852* (2013.01)

(58) Field of Classification Search
None
See application file for complete search history.

(56) References Cited

U.S. PATENT DOCUMENTS

| | | | |
|---|---|---|---|
| 2002/0107908 A1* | 8/2002 | Dharanikota | H04L 41/5003 709/203 |
| 2008/0037532 A1* | 2/2008 | Sykes | H04L 41/147 370/389 |
| 2011/0225311 A1 | 9/2011 | Liu et al. | |
| 2015/0163147 A1 | 6/2015 | Li et al. | |
| 2016/0204916 A1 | 7/2016 | Dao | |
| 2016/0352645 A1* | 12/2016 | Senarath | H04L 47/41 |

FOREIGN PATENT DOCUMENTS

| | | |
|---|---|---|
| CN | 103379516 A | 10/2013 |
| CN | 103475719 A | 12/2013 |
| WO | 2014102351 A1 | 7/2014 |

OTHER PUBLICATIONS

Thomsen et al. "Effective Caching of Shortest Paths for Location-Based Services." SIGMOD 2012. May 20-24, 2012.*

(Continued)

*Primary Examiner* — Scott B Christensen

(57) ABSTRACT

A method and apparatus for deploying a set of network caches in a communication network is provided. A set of network nodes is identified such that, for each of a set of client device locations, and for at least a number c of the set of nodes, output of a coverage cost function is no greater than a threshold. The coverage cost function receives as input a client location and one of the nodes. The set of network caches are then located at the respective set of nodes. The set of network nodes can be selected from plural candidate sets based on a utility criterion. The candidate sets can be generated by successive addition and/or removal of nodes. Information obtained from a Traffic Engineering function can be used to direct selection of the set of nodes. A cache-client association can be generated for directing clients to particular caches.

22 Claims, 12 Drawing Sheets

(56) References Cited

OTHER PUBLICATIONS

Ahlehagh, H. and Dey, S., "Video-Aware Scheduling and Caching in the Radio Access Network," Networking, IEEE/ACM Transactions on, vol. 22, No. 5, pp. 1444,1462, Oct. 2014.

Ari Luotonen and Kevin Altis, "World-wide Web proxies," In Computer Networks and ISDN systems. First International Conference on the World-Wide Web, Elsevier Science BV, 1994.

Borst, S.; Gupta, V.; Walid, A., "Distributed Caching Algorithms for Content Distribution Networks," 2010 Proceedings IEEE INFOCOM, Mar. 14-19, 2010.

E. Bastug, M. Bennis, M. Kountouris, and M. Debbah, "Cache-enabled small cell networks: Modeling and tradeoffs," EURASIP Journal on Wireless Communications and Networking 2015.

Ejder Bastug, Mehdi Bennis and Mérouane Debbah, "Transfer Learning Approach for Cache-Enabled Wireless Networks," in Proc. 2015 IEEE ICC ETSI, "Content Delievery Network (CDN) Architecture," TS 182 019 V3.1.2, TISPAN, Sep. 2011.

G. Szabo and B. A. Huberman, "Predicting the popularity of online content," Commun. ACM, pp. 80-88, 2010.

Haiyong Xie; Guangyu Shi; Pengwei Wang, "TECC: Towards collaborative in-network caching guided by traffic engineering," 2012 Proceedings IEEE INFOCOM, pp. 2546-2550, Mar. 25-30, 2012.

Imbrenda, Claudio, Muscariello, Luca and Rossi, Dario, Analyzing Cacheable Traffic in ISP Access Networks for Micro CDN applications via Content-Centric Networking. In 1st ACM SIGCOMM Conference on Information-Centric Networking (ICN-2014), Paris, France, Sep. 2014.

J. Mogul and P. Leach, "Simple Hit-Metering and Usage-Limiting for HTTP," IETF RFC 2227, Oct. 1997.

Jie Dai; Zhan Hu; Bo Li; Jiangchuan Liu; Baochun Li, "Collaborative hierarchical caching with dynamic request routing for massive content distribution," INFOCOM, 2012 Proceedings IEEE, pp. 2444-2452, Mar. 25-30, 2012.

Jun He, Honghai Zhang, Baohua Zhao, and Sampath Rangarajan, "A collaborative framework for in-network video caching in mobile networks," in Proc. of 10th IEEE Sensor, Mesh and Ad Hoc Communications and Networks (SECON), 2013.

K. Poularakis, G. Iosifidis, L. Tassiulas, "Approximation Algorithms for Mobile Data Caching in Small Cell Networks", IEEE Transactions on Communications, vol. 62, issue 10, 2014.

M. S. ElBamby, M. Bennis, W. Saad, and M. Latva-aho, "Content-aware user clustering and caching in wireless small cell networks," in 11th International Symposium on Wireless Communication Systems (ISWCS), Barcelona, Spain, Aug. 2014.

N. T. Spring and D. Wetherall, "A protocol-independent technique for eliminating redundant network traffic," in Proc. SIGCOMM, pp. 87-95, 2000.

P Krishnan, Dan Raz, and Yuval Shavitt, "The Cache Location Problem," IEEE/ACM Transactions on Networking, 8(5):568-582, Oct. 2000.

R. Fielding, M. Nottingham, J. Reschke, "Hypertext Transfer Protocol (HTTP/1.1): Caching," IETF RFC 7234, Jun. 2014.

R. Krishnan, Dilip Krishnaswamy, D. R. Lopez, Peter Willis, and Asif Qamar, "An Open NFV Architectural Framework for Virality Based Content Caching," Internet Research Task Force (IRTF), Internet Draft, Jul. 21, 2014, Expires: Dec. 2014.

Shanmugam, K.; Golrezaei, N.; Dimakis, A.G.; Molisch, A.F.; Caire, G., "FemtoCaching: Wireless Content Delivery Through Distributed Caching Helpers," IEEE Transactions on Information Theory, vol. 59, No. 12, pp. 8402,8413, Dec. 2013.

Shirin Nilizadeh, Sonia Jahid, Prateek Mittal, Nikita Borisov, and Apu Kapadia, "Cachet: A Decentralized Architecture for Privacy Preserving Social Networking with Caching," in Proceedings of The 8th ACM International Conference on Emerging Networking Experiments and Technologies (CoNEXT '12), pp. 337-348, Nice, France, Dec. 10-13, 2012.

Steven Glassman, "A caching relay for the world wide web," In Proc. First International Conference on the World-Wide Web, CERN, Geneva, Switzerland, May 1994.

Syed Hasan, Sergey Gorinsky and Ramesh K. Sitaraman, "Tradeoffs in Optimizing the Cache Deployments of CDNs," IEEE INFOCOM Conference, May 2014.

Xu Cheng; Dale, C.; Jiangchuan Liu, "Statistics and Social Network of YouTube Videos," Quality of Service, 2008. IWQoS 2008. 16th International Workshop on, vol., No., pp. 229,238, Jun. 2-4, 2008.

Y Guan, Y Xiao, H Feng, CC Shen, LJ Cimini Jr, "MobiCacher: Mobility-Aware Content Caching in Small-Cell Networks," in Proc. 2014 IEEE Globecom Conf., 2014.

H. Farmanbar and H. Zhang, "Traffic engineering for software defined radio access networks," 2014 IEEE Network Operations and Management Symposium (NOMS), pp. 1-7, May 5-9, 2014.

* cited by examiner

METHOD AND SYSTEM FOR PROVIDING NETWORK CACHES

FIELD OF THE INVENTION

The present invention pertains to the field of communication networks, and in particular to a method and system for providing network caches in a communication network.

BACKGROUND

Communication network performance can be improved through the use of in-network data caches. Caches store certain data content which is expected to be requested by client devices. When data is to be provided to a client device, the data can be transmitted from a nearby cache instead of a relatively remote originating server. Data caching may be deployed as a solution to reduce traffic volume as well as packet transmission delay in networks.

The optimal deployment of caches in a network has been recognized as a difficult problem. The widely used criterion for optimizing cache placement is average packet delay. In P. Krishnan et al., "The Cache Location Problem," IEEE/ACM Transactions on Networking, Vol. 8, No. 5, October 2000, it is recognized that the general problem of optimizing the location of k caches in the network for criteria such as minimum average delay is intractable, although optimal solutions can be found for some special cases. However, it would be beneficial to develop more effective approaches to the problem of cache deployment.

Therefore there is a need for a method and apparatus for providing network caches that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for providing network caches. In accordance with embodiments of the present invention, there is provided a method for providing a set of network caches in a communication network serving a set of client device locations, the method comprising: obtaining a cost threshold; obtaining an indication of a coverage cost function receiving as input: one of the set of client device locations; and a node of the communication network, and returning a corresponding value as output; determining a set of nodes of the communication network satisfying a content coverage constraint indicative that, for each one of the set of client device locations: output of the coverage cost function, when receiving as input said one of the set of client device locations and at least a predetermined number c of the set of nodes, is less than or equal to the cost threshold; and locating the set of network caches at the respective set of nodes. The obtaining and determining operations can be performed by a cache placement controller.

In accordance with embodiments of the present invention, there is provided a cache placement controller configured to direct provision of a set of network caches in a communication network serving a set of client device locations, the cache placement controller comprising a network interface, a microprocessor, and a memory component and configured to: obtain a cost threshold; obtain an indication of a coverage cost function receiving as input: one of the set of client device locations; and a node of the communication network, and returning a corresponding value as output; determine a set of nodes of the communication network satisfying a coverage constraint indicative that, for each one of the set of client device locations: output of the coverage cost function, when receiving as input said one of the set of client device locations and at least a predetermined number c of the set of nodes, is less than or equal to the cost threshold; and provide instructions for execution by the network to locate the set of network caches at the respective set of nodes.

In accordance with embodiments of the present invention, there is provided a network data cache or set of network data caches which are provided at nodes in a communication network in accordance with the above-described method for providing network caches and/or cache placement controller.

In accordance with embodiments of the present invention, there is provided a network cache in a communication network serving a set of client device locations, the network cache belonging to a set of network caches located at a corresponding set of nodes of the communication network satisfying a content coverage constraint indicative that, for each one of the set of client device locations: output of a predetermined coverage cost function, when receiving as input said one of the set of client device locations and at least a predetermined number c of the set of nodes, is less than or equal to a predetermined cost threshold, the coverage cost function returning a corresponding value as output when receiving as input: one of the set of client device locations; and a node of the communication network. In some embodiments, the provided set of network data caches that, for each item of a set of cached data content, each client device location is within n hops of at least one of the network caches holding that item of cached data content.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
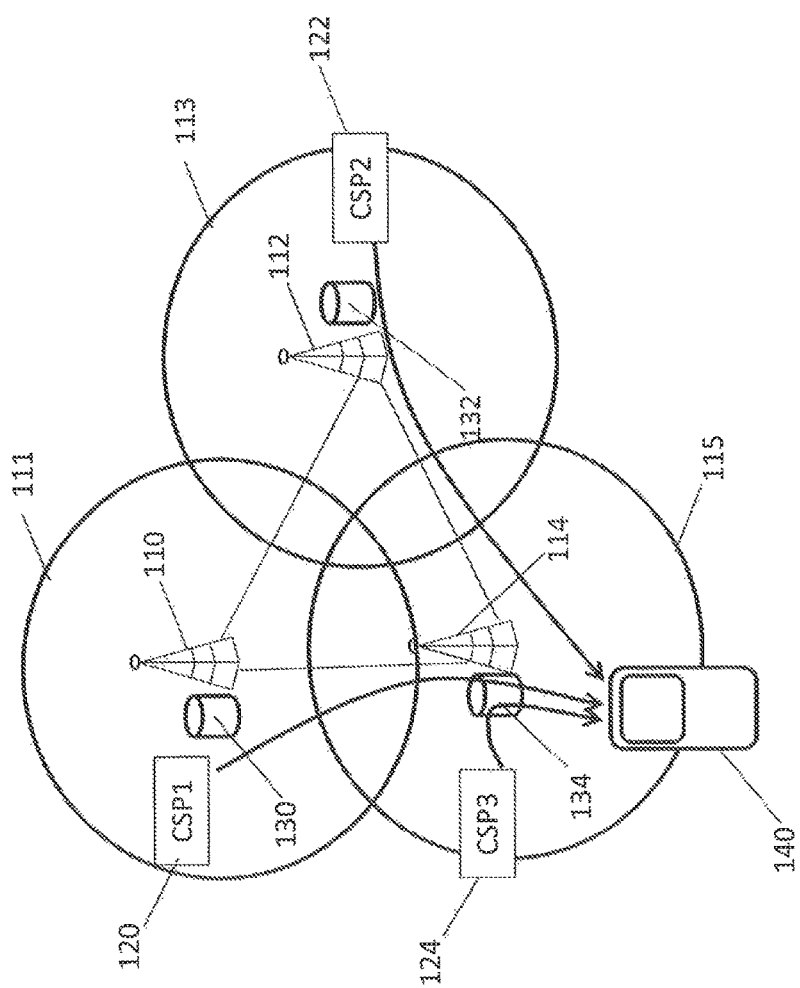
FIG. 1 illustrates an example of content coverage area in accordance with an embodiment of the present invention.

Embodiments of the present invention provide for a method and system for providing a set of K network caches in a communication network having N≥K nodes at which the caches can potentially be selected to cache data contents of a single or multiple Content Service Providers (CSP)s. A network node could be a radio node, such as a Wi-Fi access point or LTE base station, a router, a switch, a customer premise equipment (CPE) or another network device. The network nodes may or may not have caching functions initially. For network nodes that are selected to provide caching functions, those nodes already have caches or will be able to add caching functions. The communication network serves a set of client device locations. Each client device location can include one or more client devices. An example of a client device location is a coverage area of a cellular network, or another region which is served by a radio access point. Examples of client devices are User Equipment devices (UEs), machine-to-machine devices, and other wireless terminal devices.

As used herein, a cache may be a network node having a Caching, Computing and Forwarding (CCF) node or network function. The caching function is configured to manage content in the cache. The computing functions are configured to process content to make it suitable for data transmission. For example, data packets of a content item can be encoded by a fountain code; video or image content can be transcoded to produce video or image quality matching with the display of users. The forwarding functions are configured to handle data transmission between caches or between cache and users.

Embodiments of the present invention explicitly or implicitly employ a coverage cost function for use in evaluating the network locations (nodes) at which caches are to be potentially placed. The coverage cost function receives as input a client device location and a node of the communication network, corresponding to a potential cache location, and provides as output a value based thereon. The coverage cost function can represent a cost of conveying data to a client device at the specified client device location from a network cache potentially located at the specified node. An example of a coverage cost function is data propagation delay, for example measured in units of time or in a number of hops required to propagate the data from a specified node to a specified client device location. A coverage cost function may be a computer-generated correspondence between inputs and outputs, for example as performed using a lookup table or other device. The coverage cost function may correspond to a real observed cost or an assigned cost.

Embodiments of the present invention provide network caches at a set of network nodes such that a coverage constraint is satisfied. The coverage constraint specifies that, for each given client device location and for each given item of cached data content, there exists at least c network caches, holding the given item of cached data content, such that the cost function applied to the given client device location and each of the at least c network caches is below a predetermined value referred to as the cost threshold. In some embodiments, c is equal to one. In some embodiments, the cost threshold can be a function of the given item of cached data content, or a function of a type of cached data content.

Some embodiments of the present invention are configured to deploy a set of caches in order to satisfy one or more specific requirements. A first requirement corresponds to a packet delay criterion which relates to the amount of data propagation delay experienced in transmitting data from a cache to a client device, for example measured in a number of hops. In some embodiments, the first requirement includes that an upper limit on this data propagation delay should tend to be uniform throughout the network. A second requirement is that the load on a given cache must be less than a predetermined maximum load. The load may represent the number of simultaneous sessions supported by the cache and/or the amount of demand on computing resources accessible to the cache. A third requirement is that the cache deployment should be configured so as to provide for an adequately high network throughput. Network throughput may be maintained for example by avoiding bottlenecks and avoiding usage of long or constrained routing paths for requesting and transmitting cached data content. The network throughput may correspond to transmission of cached data or to transmission of all network data. A fourth requirement that the cache deployment should be configured so as to provide for adequate user experience, for example as set forth in a user Service Level Agreement (SLA).

One, some or all of the above requirements may be encoded in a utility function to be substantially optimized by the cache placement solution. The utility function may be regarded as an objective function of an optimization problem. Optimization of the utility function may correspond to local or global maximization, approximate maximization, achievement of at least a threshold value of the utility function, or the like. For example, the utility function can be the monetary cost per delivered bits. Other ones of the above requirements may be encoded in a set of constraints to be respected by the cache placement solution. For example, the packet delay criterion may be respected by setting the coverage cost function equal to the data propagation delay.

In some embodiments, network characteristics such as the network topology and link throughput may be determined and used to configure the utility function. For example, network characteristics may be retrieved from a Traffic Engineering controller of the communication network. The network characteristics may be provided as values for parameters of the utility function. Other characteristics such as SLA characteristics may be provided by other network entities.

In some embodiments, the utility function may encode trade-offs between packet delay and cache deployment costs. For example, while the packet delay is generally expected to decrease as the number of deployed caches increases, the monetary cost increases with the number of deployed caches. Further, deploying caches at some nodes, such as radio edge nodes, may be more expensive than deploying caches at other nodes. Yet further, at some nodes such as radio edge nodes, deployment costs may increase with cache size. As another example, cache deployment costs associated with a pre-existing cache may be low to zero.

In some embodiments, different caches store different data content, and cache placement is performed accordingly. The use of different caches to store different data content allows content to be distributed throughout the network, and avoids the requirement for large, potentially expensive caches. However, this approach requires the consideration of each item of data content. Collections of data content may be of varying granularity. For example, an item of data content may correspond to a standardized repository of content, such as a collection of popular videos distributed by a certain service, or a website or collection of websites. Each collection may be considered separately regarding decisions of where to cache same.

In some embodiments, each cache may store all of the data content to be cached. In this case, only one global collection of data content (including all currently stored items) needs to be considered. The content coverage area of this cache will cover the whole network.

In various embodiments, the cost threshold is a delay threshold. For example, the delay threshold may specify that a maximum number of hops allowable for conveying data packets from the set of network caches to client devices located in the set of client device locations is n hops. Embodiments of the present invention provide a cache placement solution such that, for each item of cached data content, each client device location is within n hops of at least one of the network caches holding that item of cached data content. In some embodiments, the delay threshold may vary by content or content type.

The use of a cost threshold, such as a delay threshold, may facilitate providing a consistent user experience throughout the network. In particular, when the cost threshold incorporates a threshold value related to user experience, such as bandwidth or latency, embodiments of the present invention provide a cache placement solution such that the cost function is consistently below the cost threshold, and hence the user experience is consistently above a threshold minimum quality. In some embodiments therefore, a minimum threshold performance, such as a uniform propagation delay, may be substantially guaranteed across all users.

As used herein, the term "content coverage area" refers to an area of a network, such as a set of one or more client device locations, such that, for each client device location of the content coverage area, there exists at least one network cache such that the cost function, applied to the given client device location and the at least one network cache, is below the cost threshold value. In various embodiments it is desired to maximize the content coverage area and/or ensure the content coverage area covers all client device locations. The content coverage area may refer to all data content, to a specific item of data content, or to a specific type of data content.

FIG. 1 illustrates the concept of content coverage area by way of an example. Three radio nodes 110, 112, 114 and three content service providers (CSP)s 120, 122, 124 are illustrated, for example YouTube™, FaceBook™ and NetFlix™. Each radio node 110, 112, 114 serves client devices in a corresponding practical communication range 111, 113, 115. Caches 130, 132, 134 are potentially provided at each of the three radio nodes and configured to store content of one or more of the CSPs. A wireless client device 140 is also illustrated, being a distance of one hop from a first radio node 110 and a distance of two hops from the other radio nodes 112, 114. If the delay threshold is one hop, then the content coverage area of each cache is equal to the practical communication range of its host radio node. In this case, all three caches would be required, each storing the content of all three CSPs. However, if the delay threshold is two hops, the CCA of any cache is the entire three-cell network, i.e. the union of communication ranges 111, 113, 115, also referred to as the radio coverage area. In this case, a single one of the caches 130, 132, 134 can be deployed, storing the content of all three CSPs. Alternatively, multiple caches 130, 132, 134 can be deployed, each cache potentially storing less than all content of the three CSPs, but all caches collectively storing all content of the three content service providers. This solution allows for smaller caches and corresponding reduced costs. In the illustrated solution, a cache is deployed at each radio node, with each cache being dedicated to storing content of a separate content service provider.

Figure 2A:
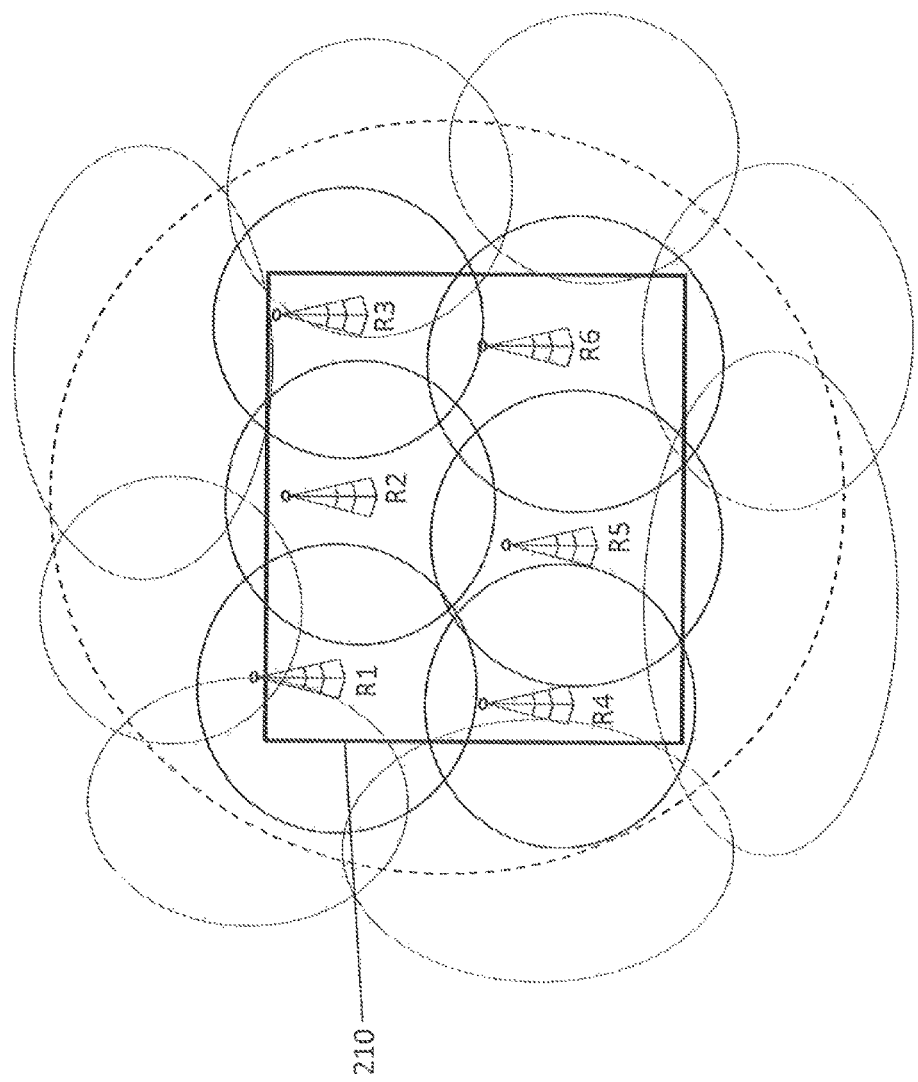
FIG. 2A illustrates an example of a radio coverage area, in accordance with an embodiment of the present invention.

FIG. 2A illustrates an example of a radio coverage area, in accordance with an embodiment of the present invention. Six radio nodes, such as radio access points, base stations, or other wireless transceiver stations, are provided. The circle around each node represents its practical communication range. The six nodes are therefore required in order to provide radio coverage to the rectangular area 210. Each radio node can serve as a potential location for a network cache, and it is desired to provide network caches so that the content coverage area for all cached content also includes the rectangular area 210. Each of the provided network caches may hold a copy of all data content of one or multiple CSPs to be cached, depending on the coverage cost function or SLA between network operator and CSP.

Figure 2B:
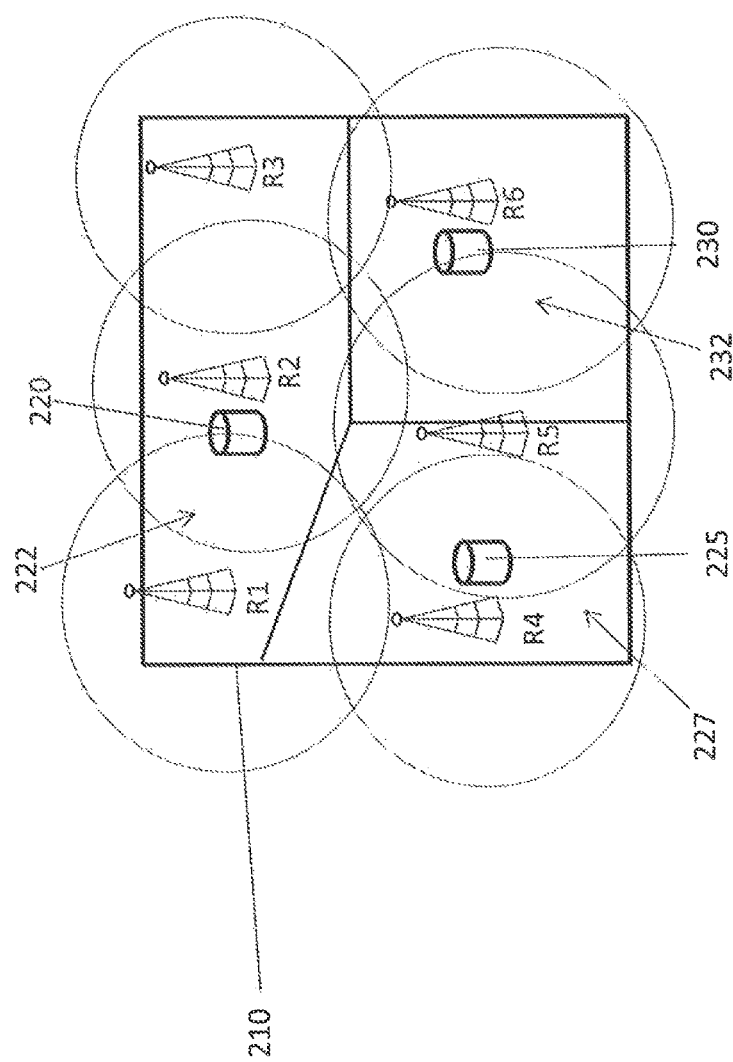
FIG. 2B illustrates a first example configuration of three network caches which are provided such that the content coverage area includes the radio coverage area of FIG. 2A.

FIG. 2B illustrates a first example configuration of three network caches which are provided such that the content coverage area includes the rectangular area 210. The coverage cost function in this case is the number of hops from the cache to a wireless client device served by one of the radio nodes, and the cost threshold is a delay threshold equal to two hops. A first cache 220 serves a first portion 222 of the area 210, a second cache 225 serves a second portion 227 of the area 210, and third cache 230 serves a third portion 232 of the area 210. Each client device can receive cached data via a combination of a wired hop from radio node to radio node, followed by a wireless hop from radio node to client device.

Figure 2C:
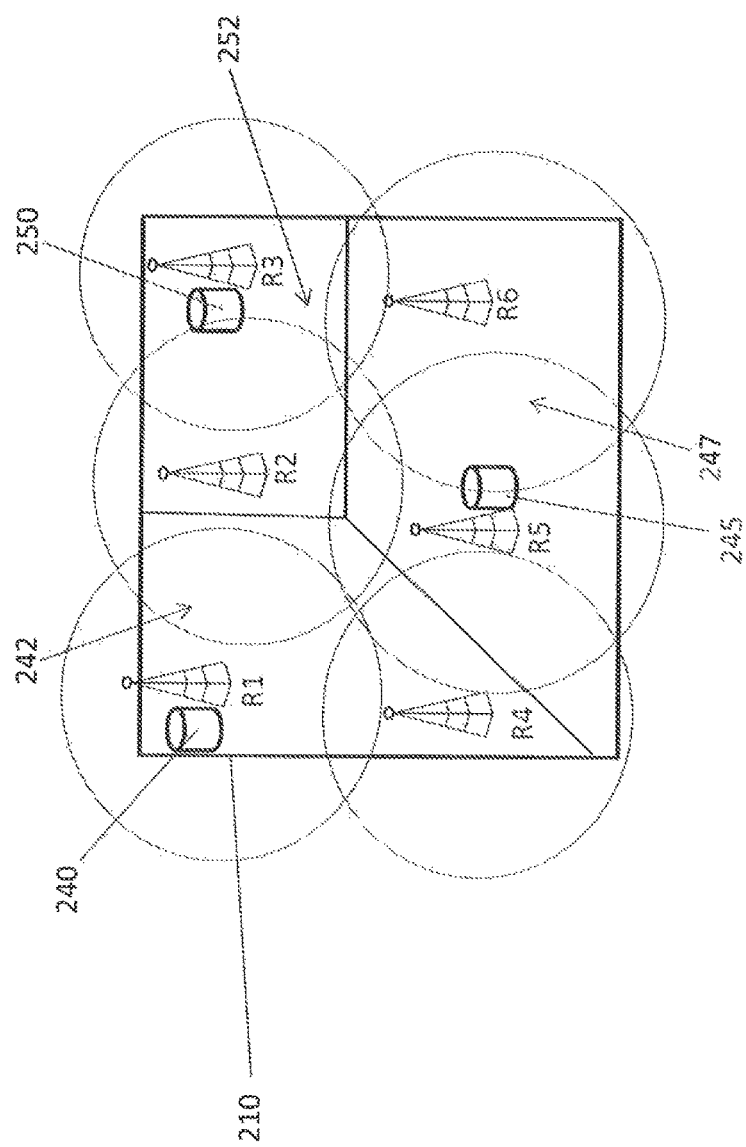
FIG. 2C illustrates a second example configuration of three network caches which are provided such that the content coverage area includes the radio coverage area of FIG. 2A.

FIG. 2C illustrates a second example configuration of three network caches which are provided such that the content coverage area includes the rectangular area 210. The coverage cost function in this case is the number of hops from the cache to a wireless client device served by one of the radio nodes, and the cost threshold is a delay threshold equal to two hops. A first cache 240 serves a different first portion 242 of the area 210, a second cache 245 serves a second portion 247 of the area 210, and third cache 250 serves a third portion 252 of the area 210. The caches and portions of the area 210 in FIG. 2C differ from those of FIG. 2B. Again, each client device can receive cached data via a combination of a wired hop from radio node to radio node, followed by a wireless hop from radio node to client device.

The example configurations of FIGS. 2B and 2C both utilize three caches. Among these configurations, one may be selected for use based on a utility criterion. Variations in link capacity and user distribution in the network may result in a different pattern of user experiences for the configuration of FIG. 2B relative to the pattern of user experiences for the configuration of FIG. 2C. Each user experience may be indicative of downloading throughput for cached content, for example. The utility criterion for a given configuration may reflect an overall measurement of user experience for that configuration. The configuration with higher overall measure may be selected. Each of the example configurations corresponds to a candidate set of nodes at which caches can be placed.

Embodiments of the present invention provide for relatively efficient computation of network cache placement solutions. In one embodiment, a cache placement can be computed with computational complexity which is proportional to the number of potential cache locations (nodes) N of the network. In one embodiment, a cache placement can be computed with computational complexity which is proportional to the square of the number of potential cache locations N of the network.

Embodiments of the present invention can be implemented in coordination with a Traffic Engineering (TE) function of the network. The TE function may be used to calculate the data throughput that each client device receives, for example given a proposed number of network caches and/or cache configuration. In some embodiments, the TE function provides information which may be used in computation of utility of a candidate cache location solution, so that multiple candidate solutions can be evaluated on the basis of utility. The utility may correspond to a predetermined utility criterion such as a utility function. Messages may be passed to and/or from the TE function to facilitate cache placement. The TE can identify a single path or multiple paths between a cache and a user device such that the number of hops of these paths does not exceed a threshold. Then the TE can compute an optimal data rate over data paths that a cache or multiple caches can send to user devices. Traffic Engineering operations can include, for example, operations such as are described in U.S. Patent Application Publication No. 2015/0163147 and/or U.S. patent application Ser. No. 14/592,616.

The utility criterion may take into consideration one or more Key Performance Indicators (KPI)s such as packet delay, network throughput, operational expenditure (OPEX), capital expenditure (CAPEX), and robustness. Some KPIs may be obtained from the TE function, such as optimal traffic allocations, and data throughput and delay parameters. OPEX and CAPEX considerations can be related to the cost of providing and maintaining a cache at a given node. These costs may include the costs of providing the equipment such as memory, and processor components, as well as the costs of maintaining the equipment, such as electricity costs, location costs, and maintenance costs. OPEX and CAPEX considerations may also include costs related to providing and maintaining adequate wired and/or wireless data links at a given node. In some embodiments, the utility criterion may correspond to the number of bits delivered to users per cost unit.

Embodiments of the present invention provide a cache location solution which specifies some or all of: the number of caches to be deployed; the locations of the deployed caches; and cache-client associations satisfying a coverage constraint.

Rather than exhaustively considering all possible cache placement solutions and selecting the most desirable one, embodiments of the present invention provide computationally simpler approaches to determining an adequate, although potentially sub-optimal, cache placement solution. At least some such approaches may exhibit polynomial complexity in the number of nodes at which a cache can potentially be placed.

Figure 3:
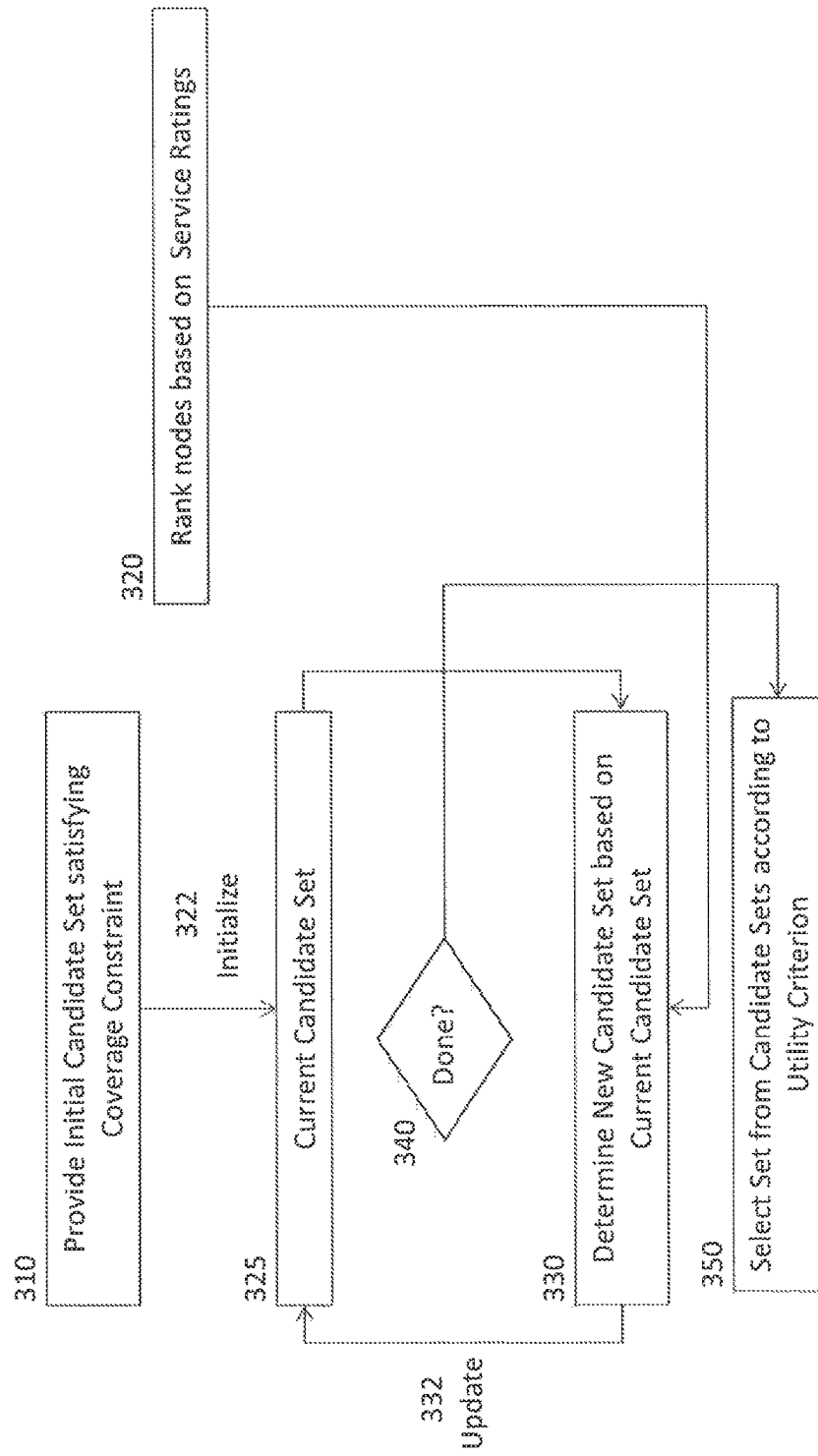
FIG. 3 illustrates a procedure for providing network caches in accordance with an embodiment of the present invention.

FIG. 3 illustrates a procedure for providing network caches in accordance with an embodiment of the present invention. First, an initial candidate set of nodes is determined 310 such that, if a cache were placed at each node of the candidate set, the coverage constraint would be satisfied. If an initial candidate set of nodes cannot be determined, a network issue can be identified, cached data may be redistributed, and/or the cost threshold can be relaxed. The initial candidate set can include all potential network nodes that have CCF functions.

Additionally, in some embodiments, each of the N nodes of the network are assigned a service rating and ranked 320 in order based on their service ratings. The service rating of a node indicates the expected count of client devices that would be served by a cache placed at that node. If a cache at a first node would serve a larger number of UEs than a cache at a second node, then the first node is assigned a higher ranking than the second node. In some embodiments, the ranking 320 is performed as a separate operation, for example prior to use of rankings as described below. In other embodiments, the ranking 320 is performed on an as-needed basis. For example, when two or more nodes require comparison in terms of their rank, the ranking of these two or more nodes may be performed. The results of ranking operations can be saved for subsequent use, and rankings can be updated as more nodes are ranked. Each node may report its own service ratings, or service ratings may be assigned by an external entity. Nodes can determine their service rating rank, or rank may be determined by an external entity.

Subsequent to its determination, the initial candidate set is used as a seed for determining further candidate sets as follows. A current candidate set 325 is initialized 322 as being equal to the initial candidate set. Subsequently, an attempt is made to determine 330 a new candidate set by adjusting the current candidate set. If a new candidate set is determined, the new candidate set may be evaluated, and the current candidate set is updated 332 as equal to the new candidate set, and the process is repeated. The process may be repeated multiple times to create multiple candidate sets. As candidate sets are generated, various characteristics are recorded. For example, a record may be maintained of all generated candidate sets for later evaluation. As another example, a record may be maintained of the current best candidate set, according to a utility criterion. If a new candidate set is determined which has a higher utility, or if the current best candidate set is not yet defined, then the new candidate set becomes the current best candidate set. Otherwise, the current best candidate set is unchanged.

At one or more points during the repeated process, a stopping condition 340 can be evaluated, and, if the stopping condition is satisfied, then the generation of candidate sets terminates. The stopping condition may be, for example, that no new candidate sets satisfying the coverage constraint can be found, or that a candidate set has been found having an adequately high utility.

Following generation of candidate sets as described above, a candidate set is selected 350 according to the predetermined utility criterion. The selected candidate set may be the candidate set having the highest value of a utility function. In some embodiments, selection may involve comparison of utilities of multiple candidate sets. In some embodiments, when the current best candidate set is tracked, selection may simply involve selecting the current best candidate set after generation of candidate sets is complete.

In some embodiments, each new candidate set may be generated by removing nodes from the current candidate set. In this case, the initial candidate set may be equal to all nodes of the network which already have caches and/or which will be equipped with new caches if they are selected, and hence may be simple to determine.

Figure 4:
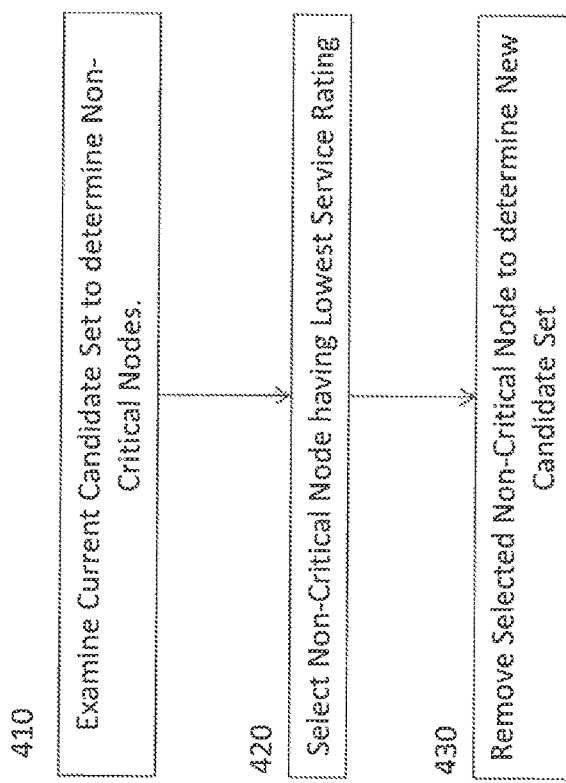
FIG. 4 illustrates a first procedure for determining a new candidate set of nodes at which to place network caches, in accordance with an embodiment of the present invention.

In accordance with an embodiment of the present invention, and with reference now to both FIG. 3 and FIG. 4, a first procedure for determining 330 a new candidate set of nodes at which to place network caches from a current candidate set is described as follows. The current candidate set 325 is examined 410 to determine at least one non-critical node belonging thereto. The non-critical node is defined as a node for which the combination of content coverage areas of all remaining nodes covers the whole network if the cache is removed from the non-critical node. If multiple non-critical nodes are identified in the current candidate set, then the non-critical node having the lowest service rating is selected 420, for example based on the ranking 320. A subset of non-critical nodes (of the current candidate set) is referred to as a non-critical subset. That is, the non-critical subset corresponds to nodes, of the current candidate set, any one of which is removable while retaining satisfaction of the coverage constraint by the remainder of the current candidate set. In some embodiments, all nodes of the current candidate set are examined to determine whether they are non-critical nodes, and all non-critical nodes are ranked. In other embodiments, a limited number of nodes of the current candidate set are examined.

Subsequently, the new candidate set is determined 330 as being equal to the current candidate set minus the selected non-critical node. In other words, the new candidate set is determined by removing 430 the selected non-critical node from the current candidate set. A utility of the new candidate set may then be determined, for example by application of a predetermined utility function. In one embodiment, the new candidate set is saved, along with an indication of its utility, for later consideration. In another embodiment, the new candidate set is saved and utilities of multiple candidate sets are determined as a batch.

In one embodiment, when a new candidate set is determined by removing nodes from the current candidate set, the stopping condition 350 corresponds to a condition that the most recently derived candidate set is devoid of non-critical nodes. Since a new candidate set is defined by removing a node from a current candidate set, the candidate sets are nested in the sense that each new candidate set is strictly contained in its predecessors.

Figure 5:
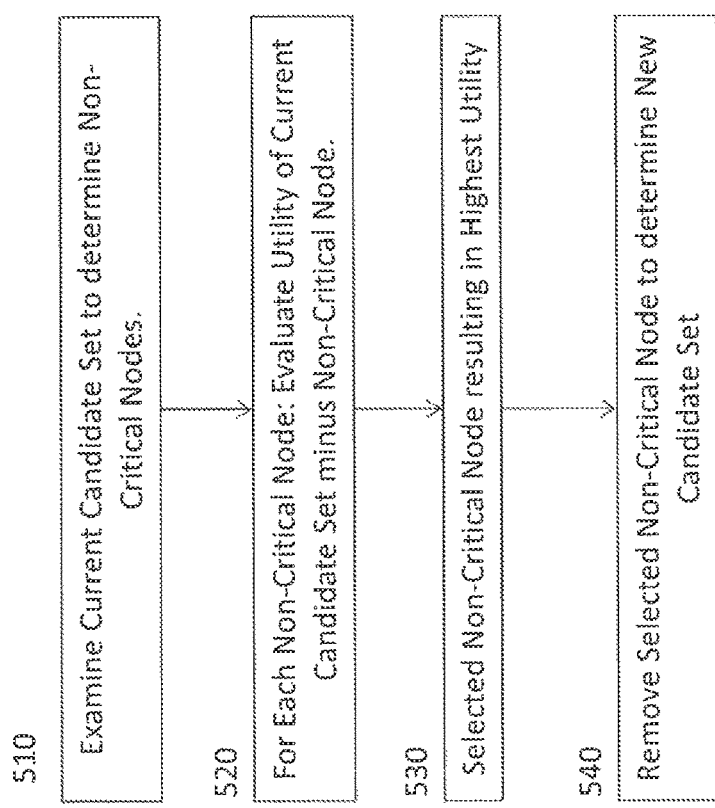
FIG. 5 illustrates a second procedure for determining a new candidate set of nodes at which to place network caches, in accordance with an embodiment of the present invention.

In accordance with an embodiment of the present invention, and with reference now to both FIG. 3 and FIG. 5, a second procedure for determining 330 a new candidate set of nodes from a current candidate set is described as follows. In contrast with the first procedure, nodes are removed based primarily on the utility criterion, rather than on the node's service rating. Node removal may be based secondarily on service rating. The current candidate set is examined 510 to determine at least one non-critical node belonging thereto. If multiple non-critical nodes are identified in the current candidate set, then the non-critical node is selected as follows. For each node of the non-critical nodes, the current candidate set minus this non-critical node is evaluated 520 with respect to a utility criterion. For example, a utility function of the current candidate set minus the non-critical node can be evaluated.

In one embodiment of the second procedure, the non-critical node which, upon removal, results in the highest utility, is selected 530 as the determined non-critical node to be removed to define the new candidate set. In another embodiment, the $k^{th}$ non-critical node (e.g. k=1) which, upon removal, results in at least a threshold amount of utility, is selected as the determined non-critical node to be removed. The selected node is then removed 540 to determine the new candidate set.

The multiple non-critical nodes may be selected as those non-critical nodes having relatively lower service ratings compared to other non-critical nodes of the current candidate set. For example, the plurality of non-critical nodes may correspond to the M non-critical nodes having the relatively lowest service ratings, for a predetermined number M.

In some embodiments, where removal of two or more non-critical nodes would result in substantially the same utility, one of these nodes may be selected for removal. For example, the node which has a lower generated throughput may be eliminated, or the node having a smaller total output capacity may be eliminated, or a combination thereof. The generated throughput is computed by TE. The throughput may represent the sum of data rates for data content that a cache transmits to its serving UEs. The output capacity may represent the sum of transmission capacities of all physical links that directly connect a cache node with other surrounding nodes.

The above-described first procedure or second procedure for determining a new candidate set may be repeated multiple times. In the case of the first procedure, the overall repeated procedure for determining candidate sets may exhibit a computational complexity that is linear in the number of nodes N of the network at which caches can potentially be placed. In the case of the second procedure, the overall repeated procedure for determining candidate sets may exhibit a computational complexity that is of order $N^2$. It is observed that, in various embodiments, it may be desired to place caches as close to the client devices as possible. Further, as the number of client devices that are served by a particular cache increases, the cache hit ratio improves, and hence fewer caches may be required in total. Including the service rating as a criterion for selecting nodes for removal reflects such observations. In some embodiments, the service rating may equal or be related to the cache hit ratio. The concept of cache hit ratio would be readily understood by a worker skilled in the art.

The above-described procedures for determining a new candidate set can be varied in several ways. For example, rather than removing a single node to create new candidate sets, multiple nodes can be removed at a time. As another example, rather than creating one new candidate set from a current candidate set, multiple new candidate sets can be created and tracked. For example, a first new candidate set can be created by removing a first non-critical node from the current candidate set, and a second new candidate set can be created by removing a second non-critical node from the current candidate set. This procedure may result in multiple branches of candidate sets, which potentially increases complexity. Further, while each branch represents a series of nested candidate sets, candidate sets belonging to different branches are not necessarily nested. Pruning of branches and conditions for terminating a given branch may be performed to manage complexity.

Embodiments of the present invention include determining a set of nodes of the communication network satisfying the content coverage constraint and further satisfying a utility criterion, for example by maximizing a utility function among all candidate sets of nodes satisfying the constraint. In some embodiments, determining the set of nodes includes determining a plurality of candidate sets of nodes. Each of the candidate sets satisfies the coverage constraint and the candidate sets may be nested. Further, for each pair of candidate sets, a maximum value of a service rating of nodes belonging to a set difference between said pair of candidate sets is smaller than a maximum value of the service rating of non-critical nodes of the smaller of the pair of candidate sets. This condition reflects the principle that non-critical nodes having the lowest service rating are discarded when defining each new candidate set based on a current candidate set, for example in accordance with the embodiment of FIG. 3. The set difference between a first set and a second set corresponds to those nodes of the first set that are not members of the second set. In various embodiments, when one non-critical node is removed at a time, the set difference is of size unity. Determining the set of nodes then involves selecting the set of nodes from the candidate sets of nodes according to a predetermined utility criterion.

In some embodiments, determining candidate sets of nodes includes, given a first set of the plurality of candidate sets (the current candidate set), determining a second set of the plurality of candidate sets (the new candidate set) by removing one or more nodes from the first set. The removed nodes may have lowest service ratings amongst all nodes of a non-critical subset of the first set. Alternatively, the removed nodes may be selected according to a utility criterion. The non-critical subset corresponds to nodes of the first set, any one of which is removable while retaining satisfaction of the coverage constraint.

In some embodiments, rather than decrementally eliminating nodes, nodes may be incrementally added to derive new candidate sets of nodes at which caches may be placed. In accordance with an embodiment of the present invention, and with reference now to both FIG. 3 and FIG. 6, a third procedure for deriving 330 a new candidate set of nodes at which to place network caches from a current candidate set is described as follows. One or more additional nodes outside of the current candidate set is identified 630 and added 640 to the current candidate set to determine 330 the new candidate set. In some embodiments, one additional node may be added at a time. The identification 630 of additional nodes may be based on one or more criteria such as: service rating of the node to be added; incremental service rating of the node to be added; and a utility criterion applied to the current candidate set plus the additional nodes. In one embodiment, the identification 630 of additional nodes comprises evaluating, for each of a plurality of potential nodes, a utility function applied to the current candidate set plus the additional node, and selecting the additional node as the potential node which results in the maximum utility according to the utility function. Since a new candidate set is defined by adding nodes to a current candidate set, the candidate sets are nested in the sense that each new candidate set strictly contains its predecessors.

In some embodiments, for example in relation to the above-described third procedure, the utility function corresponds to the overall network throughput. If two potential nodes result in substantially the same utility, one can be selected based on a secondary criterion, such as which potential node is capable of generating higher throughput. If both utility and throughput are substantially the same for the two potential nodes, one can be selected based on a third criterion, such as which potential node would provide a cache having a higher total outgoing link capacity.

In support of the third procedure or other procedures which do not repeatedly determine new candidate sets by removing nodes from the current candidate set, the initial candidate set may be generated such that it contains less than all N nodes of the network. In some embodiments, the initial candidate sets contains an approximately locally or globally minimal number of nodes subject to the content coverage constraint being satisfied. In some embodiments, nodes are selected for inclusion in the initial candidate set based at least in part on their service rating, with nodes having relatively higher service ratings being selected in favour of nodes having relatively lower service ratings.

Figure 6:
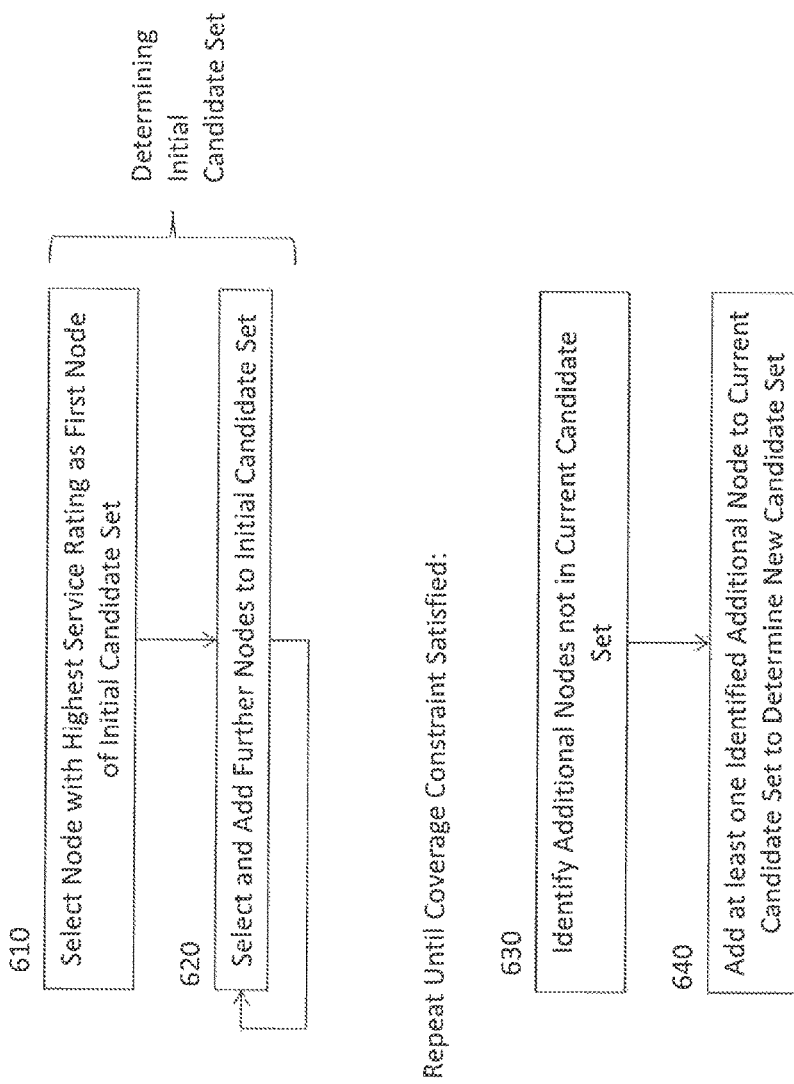
FIG. 6 illustrates a third procedure for determining a new candidate set of nodes at which to place network caches, in accordance with an embodiment of the present invention.

In one embodiment, and also with reference to FIG. 6, determining the initial candidate set comprises selecting 610 a node having the highest service rating for inclusion in the initial candidate set, followed by repeatedly selecting and adding 620 further nodes to the initial candidate set until the coverage constraint is satisfied. In some embodiments, each of the further nodes is selected based on an incremental service rating. The incremental service rating of a node corresponds to the expected additional number of client devices that would be served by a cache placed at the node, over and above the number of client devices already served by other nodes in the initial candidate set. In some embodiments, and similarly to the incremental service rating case, each of the further nodes is selected based on a criterion which preferentially selects for nodes having a combination of high service rating and low overlap between client devices served by the candidate further node and client devices already served by other nodes in the initial candidate set. In some embodiment, each of the further nodes is selected based on a criterion which preferentially selects for nodes which tend to increase a utility function of the initial candidate set by a relatively higher amount. In some embodiment, a plurality of the above criteria may be combined.

Other methods for determining the initial candidate set, such as exhaustive search over all possible combinations of 1, 2 . . . . K caches may be performed.

In view of the above, embodiments of the present invention comprise determining a plurality of candidate sets by selectively adding nodes and/or removing non-critical nodes from a current candidate set to determine a new candidate set. This addition and/or removal procedure can be repeated multiple times. In some embodiment, non-critical nodes may be successively removed to determine new candidate sets. In some embodiment, nodes may be successively added to determine new candidate sets. In some embodiment, a combination of addition of nodes and removal of non-critical nodes may be performed. For example, a new candidate set may be determined by adding some nodes but removing other nodes. As another example, a first new candidate set may be determined by removing non-critical nodes, and a second new candidate set may be determined by adding nodes to the first candidate set or another candidate set. Addition and/or removal of critical and/or non-critical nodes can be performed based on various criteria, such as absolute or relative service ratings of nodes, utility criteria applied to the set of nodes minus the non-critical nodes under consideration for removal, or the like, or a combination thereof.

A more general procedure for providing network caches in accordance with another embodiment of the present invention is now described. The procedure can again be understood with reference to FIG. 3. First, an initial candidate set of nodes is determined such that, if a cache were placed at each node of the candidate set, the coverage constraint would be satisfied. Nodes may be selected for inclusion in the initial candidate set based on one or more criteria, such as absolute or relative service rating, incremental service rating, and absolute or relative contribution of the nodes to a utility of the candidate set. Next, the initial candidate set is used as a seed for determining further candidate sets by adding, removing, or adding and removing nodes. The addition and removal of nodes is performed such that the coverage constraint remains satisfied. For example, in some cases only non-critical nodes are removed. In other cases, critical nodes may be removed only if other nodes are added which restore satisfaction of the coverage constraint. Determining further candidate sets may be performed sequentially by initially setting a current candidate set equal to the initial candidate set, determining a new candidate set by adding and/or removing nodes from the current candidate set, updating the current candidate to equal to the new candidate set, and repeating the determination and update operations a predetermined number of times or until a stopping condition is reached. Following generation of candidate sets as described above, a candidate set is selected, as the set of nodes at which to place caches, according to the utility criterion. Selection of the candidate set may comprise selecting the candidate set having relatively highest utility among all candidate sets.

In one embodiment, the stopping condition may correspond to a predetermined number of candidate sets being identified having a utility above a predetermined threshold value.

In one embodiment, the stopping condition may correspond to a condition that the utility has reached a substantial maximum. For example, when nodes are removed at each step, the stopping condition can correspond to a condition that eliminating further nodes results in a smaller user throughput or other utility. In general, the more caches are used, the higher throughput users may receive.

In some embodiments, in anticipation of the possibility that users can access more than one type of content simultaneously, a predetermined amount of link capacity is reserved. The reserved link capacity may be taken out of the nominal capacity of data links for the purposes of evaluating the utility of a potential cache location solution.

In various embodiments, a given item of content may be stored in multiple caches, and the item of content may in principle be supplied to a given client device from any of these multiple caches. To avoid potential complexity, embodiments of the present invention impose a limit on the number of caches serving a given client device. Embodiments of the present invention provide for a cache-client association operation, in which each client device is associated with one or more caches and instructed to attempt data content retrieval from the associated caches. Each client device may be associated with a limited number of caches which are closest to the client device. A client device can be associated with one, two, or more caches. Different client devices may be associated with different numbers of caches. Cache-client association and cache placement may be interdependent procedures. For example, the utility function used for the cache placement procedure can be based at least in part on factors which affect cache-client association. Cache-client associations may be provided along with the indication network cache locations.

Figure 7:
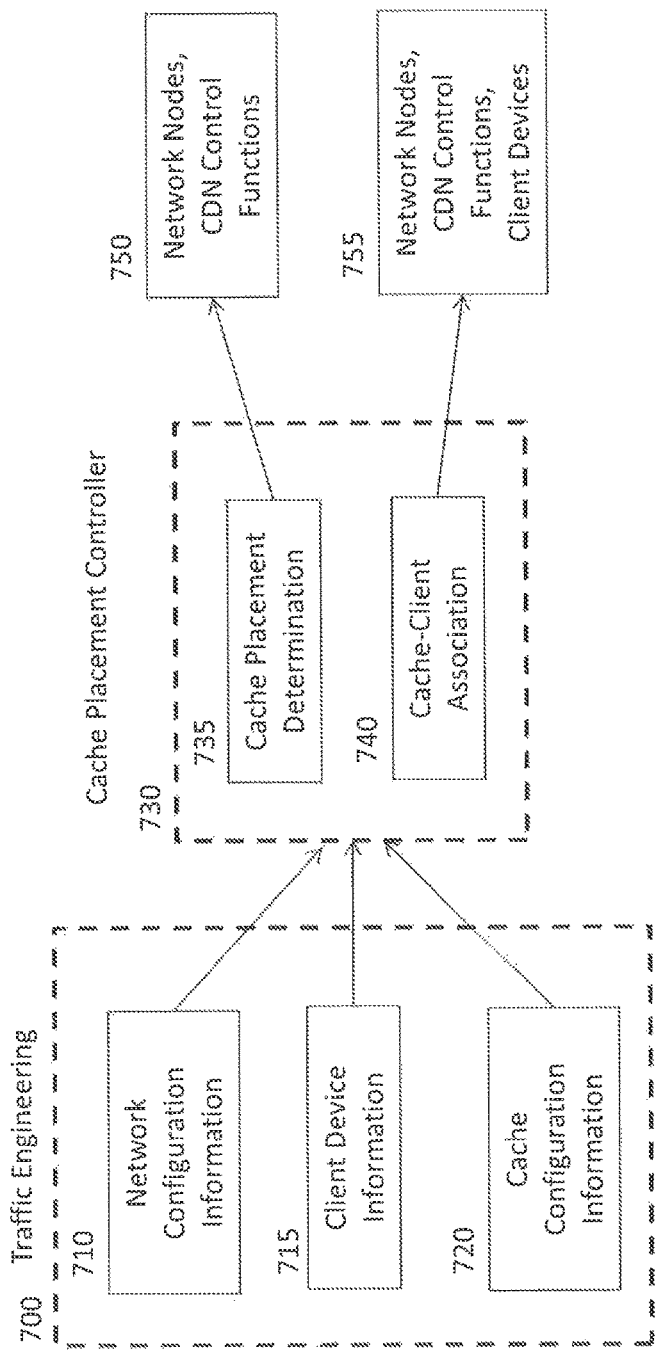
FIG. 7 illustrates cache placement and cache-client association in accordance with an embodiment of the present invention.

FIG. 7 illustrates cache placement and cache-client association in accordance with an embodiment of the present invention. Information such as network configuration information 710, client device information 715 and cache configuration information 720 is provided to a cache placement controller 730. Some or all of the information may be provided from a Traffic Engineering function 700. The network configuration information 710 may indicate network topology, capacities of network nodes and links therebetween, eligibility of nodes for placement of caches, and other information regarding the existing communication network. The client device information 715 may indicate location, link capacity, mobility, and type of client devices in the network. For wireless devices, the wireless spectral efficiency can be used by TE to determine the data rate allocated to user devices. Because of mobility, the locations of wireless devices can be changed. The client device information unit may generate random locations of user devices according to some distribution rules, such as clusters of users surrounding radio nodes, and calculate the spectral efficiency of wireless channels at user locations. The cache configuration information 720 may indicate relevant information such as utility functions, cost functions, cost thresholds, parameters of utility and/or cost functions, an indication of data content to be cached, and other information used in determining a location for network caches and/or determining cache-client associations.

The cache placement controller 730 performs cache placement determination 735 and optionally cache-client association 740 operations, based on the received information. The cache placement determination operation 735 provides an indication of network nodes of the communication network at which caches are to be selected or to be placed if required. The cache placement determination operation 735 provides instructions for use by other entities 750 such as network nodes and Content Data Network (CDN) control functions, to establish network caches at the indicated nodes. The cache-client association operation 740 provides a determination of associations to be made between particular caches and particular client devices, such that clients receive cached data primarily from their associated caches. The cache-client association operation 740 provides instructions for forming the indicated cache-client associations to entities 755 such as nodes holding caches, CDN control functions, DNSs, and/or client devices.

In some embodiments, cache-client association includes associating each client with a particular cache, such that the cost function, applied to the client device location and the node at which the cache is located, is less than or equal to the cost threshold. Such a cache is expected to exist by virtue of the cache placement procedure based on the coverage constraint described elsewhere herein. The cost threshold may be a delay threshold, for example. If more than one such cache exists for a particular client, some or all of the caches may be associated with the client. In some embodiments, at least a predetermined number of caches are associated with each client, for example selected based on the cost function, regardless of whether the cost threshold is respected.

Some embodiments of the present invention provide a Domain Name Service (DNS) which directs client devices to an appropriate cache which is located and associated with a client as described herein. For stationary client devices, a local default DNS may be stored inside the client device. For mobile client devices, a default DNS may be set as a Serving Gateway such as a virtual user Serving Gateway (v-u-SGW), where information about the caches having requested contents is stored. In either case, when the client device is to retrieve potentially cached content, the client is directed via the default DNS IP address to a particular cache associated with the client device. The DNS may be selected and configured according to the cache-client association.

In some embodiments, the number of data paths connecting caches to client devices can be limited. That is, the set of potential data paths allowed for use in communicating data from caches to client devices may be limited to a subset of all possible data paths between caches and clients. This approach may be used to limit the computational complexity of selecting a cache and data path for use in serving a client device, and/or to provide reliable multiple paths in case of network congestion happens in some nodes.

As mentioned above, when determining candidate sets of nodes at which to locate caches, more than one node may be added or removed at a time from a current candidate set to derive a new candidate set. For example, when the current candidate set includes ten nodes, rather than removing one non-critical node to derive the new candidate set, two non-critical nodes may be removed. In some embodiments, the following procedure may be employed for removing two critical nodes at a time. The procedure can be readily adapted to remove more than two critical nodes at a time. The procedure can also be adapted to add more than two nodes at a time, or to simultaneously add and remove multiple nodes.

Starting with a current candidate set having N nodes, for example as derived according to the procedure of FIG. 3, if there exists two nodes out of the N nodes which can be removed while still satisfying the coverage constraint, then a new candidate set is defined which is equal to the current candidate set minus these two nodes. If multiple such pairs of nodes exist, then two nodes are selected for removal on the basis of network throughput, for example. That is, the two nodes which contribute the least to total network throughput are identified as the two nodes which are removed to define the new candidate set. If no two such nodes exist, then a search is performed for a single node out of the N nodes which can be removed while still satisfying the coverage constraint, and the new candidate set is defined which is equal to the current candidate set minus this single node, if such a node exists. Again, if multiple such single nodes exists, then one of the single nodes is selected for removal on the basis of network throughput. If no such single nodes exist, then the removal process terminates, or continues starting from a different initial candidate set. Among all candidate sets of caches which have been generated, one is selected based on a utility criterion. The utility criterion can reflect the traffic volume output for each cache, for example.

In various embodiments, cache placement takes into account wireless client device locations. Under some conditions, it has been observed through simulation that, for sufficiently large numbers of client devices, the cache locations are substantially independent of the wireless client device locations. Therefore, in some embodiments, cache placement proceeds under an assumption that all client devices are coupled to the network via wired connections. Further, in some embodiments, cache placement proceeds under an assumption that wireless channel capacities are constant. Further, in some embodiments, cache placement proceeds under an assumption that congestion does not occur at radio nodes, but only in core networks. As such, in some embodiments, cache placement proceeds under an assumption that client devices are co-located at radio access points.

In some embodiments, rather than accounting for all existing client devices when performing cache location procedures, the cache location procedure may proceed based on the presence of a limited number of client devices, for example corresponding to a representative sample of all client devices. This may reduce computational complexity since fewer than all client devices are considered.

In some embodiments, to reduce computational complexity, the network may be sub-divided into multiple areas, and the cache-location procedure may be carried out separately for each area. The areas may be selected to that cache-client associations are substantially independent between areas. Client devices in a first area may connect to caches in another area in case if the caches in the first area are overloaded or out of services.

In various embodiments, load sharing between caches may be provided. Caches are implemented using networked computer devices with limited processing capabilities capable of handling at maximum a certain number of request per second and a certain number of concurrent TCP flows. If a cache becomes overloaded, another cache may be configured to share its load. Load balancing functions may be handled by a network controller. In embodiments, the load-sharing cache is selected based on proximity to a client device requesting cached data.

In some embodiments, for example to accommodate video streaming applications, cache placement and operation may be configured to provide for an adequate amount of data throughput. The packet latency (delay) may potentially be sacrificed in favour of throughput. In one embodiment, multiple caches may qualify as candidates for transmitting cached data to a given client device. Some or all of these candidates may not meet the delay constraint which was used for cache placement.

In some embodiments, the utility criterion used for the cache location procedure includes a criterion that minimizes a cost per delivered bit. In some embodiments, a rate constraint may also be applied. For example, the cost function may increase as a data rate at which cached content can be provided to users decreases, and the cost threshold may be configured to reflect a threshold minimum data rate to be respected, either alone or in combination with other cost criteria. In some embodiments, when new candidate sets are generated by removing nodes from a current candidate set, a stopping condition for terminating generation of new candidate sets is based at least in part on a condition that removal of further nodes from the current candidate set would result in violation of the rate constraint.

Some embodiments of the present invention provide for network caches under the assumption that content storage costs are significantly less than content transmission costs. This assumption is justifiable for example on the basis that cached content can be shared by a potentially large number of users, and thus the storage cost can be spread across all such users.

Figure 8:
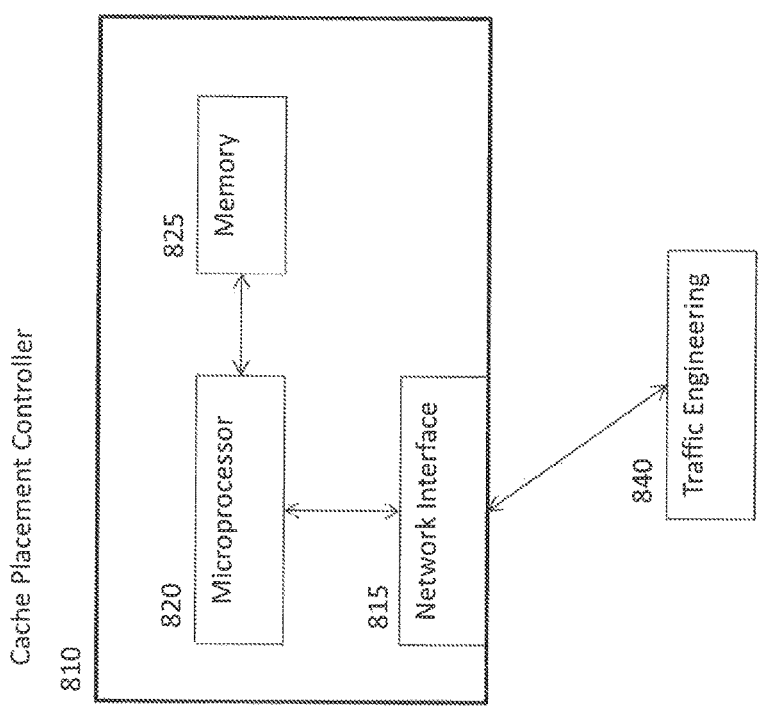
FIG. 8 illustrates a cache placement controller apparatus in accordance with an embodiment of the present invention.

Having reference to FIG. 8, embodiments of the present invention provide a cache placement controller apparatus 810 configured to direct provision of a set of network caches in a communication network serving a set of client device locations. The cache placement controller corresponds to a networked computing device having at least a network interface 815, a microprocessor 820, and a memory component 825 storing program instructions for execution by the microprocessor, or an equivalent facility for performing computations. The cache placement controller may be located in the communication network infrastructure as a real or virtualized networked computing device. In some embodiments, the cache placement controller is provided as a virtual network function. The cache placement controller may be operatively coupled to a Traffic Engineering apparatus 840 for example via the network interface 815. The cache placement controller and the Traffic Engineering apparatus may exchange messages with each other, for example to facilitate computation of the cache placement solution by the cache placement controller. The Traffic Engineering apparatus is configured to provide, for example in response to queries, information such as node service ratings, incremental service ratings, utility function values for specified sets of nodes, or parameters for use by the cache placement controller for evaluating a utility function for specified sets of nodes.

In some embodiments the cache placement controller is configured to receive, from the Traffic Engineering apparatus, information relevant to determination of the cache placement solution and/or cache-client association solution, such as cost function information, cost threshold information, other parameters related to a coverage constraint to be applied, utility function information or parameters thereof, service ratings, sets of devices and/or device locations to be served by specified nodes, utility nodes at which caches can potentially be placed, etc.

The cache placement controller is configured to determine a set of nodes of the communication network at which to locate a set of network caches. The determination may be performed via computation for example as described elsewhere herein and based on information received from the Traffic Engineering apparatus and/or other sources. The cache placement controller is further configured to provide output indicative of which nodes of the network are to include network caches. For example, the cache placement controller may be configured to transmit messages, via the network interface 815, to other elements of the communication network, such as the network nodes at which caches are to be located and/or to cache generation agents operating within the communication network. The messages may contain instructions to instantiate caches at the identified network nodes. Instantiation of the caches may then proceed as would be readily understood by a worker skilled in the art.

The cache placement controller may further be configured to generate cache-client associations. The cache placement controller may further be configured to provide the generated cache-client associations to network nodes such as client devices, DNS servers, caches, Traffic Engineering nodes, or the like, or a combination thereof. The cache placement controller may be a real or virtual network device, or a function provided by one or more real and/or virtual network devices.

Embodiments of the present invention may be used to provide network caches in a communication network that previously holds no network caches. Embodiments of the present invention may be used to provide network caches in a communication network that previously holds one or more network caches. For example, cache placement may be performed periodically or on an as-needed basis to re-optimize cache placement in a network, or to re-distribute current network and/or cache loads. In some embodiments, a previous cache placement solution is disregarded and a new cache placement solution is generated. In other embodiments, generation of the new cache placement solution is adjusted based on the previous cache placement solution. For example, generation of the new cache placement solution may be constrained such that only new caches are added, and no existing caches are removed. As another example, generation of the new cache placement solution may be constrained such that a limited number of existing caches are removed.

Figure 9A:
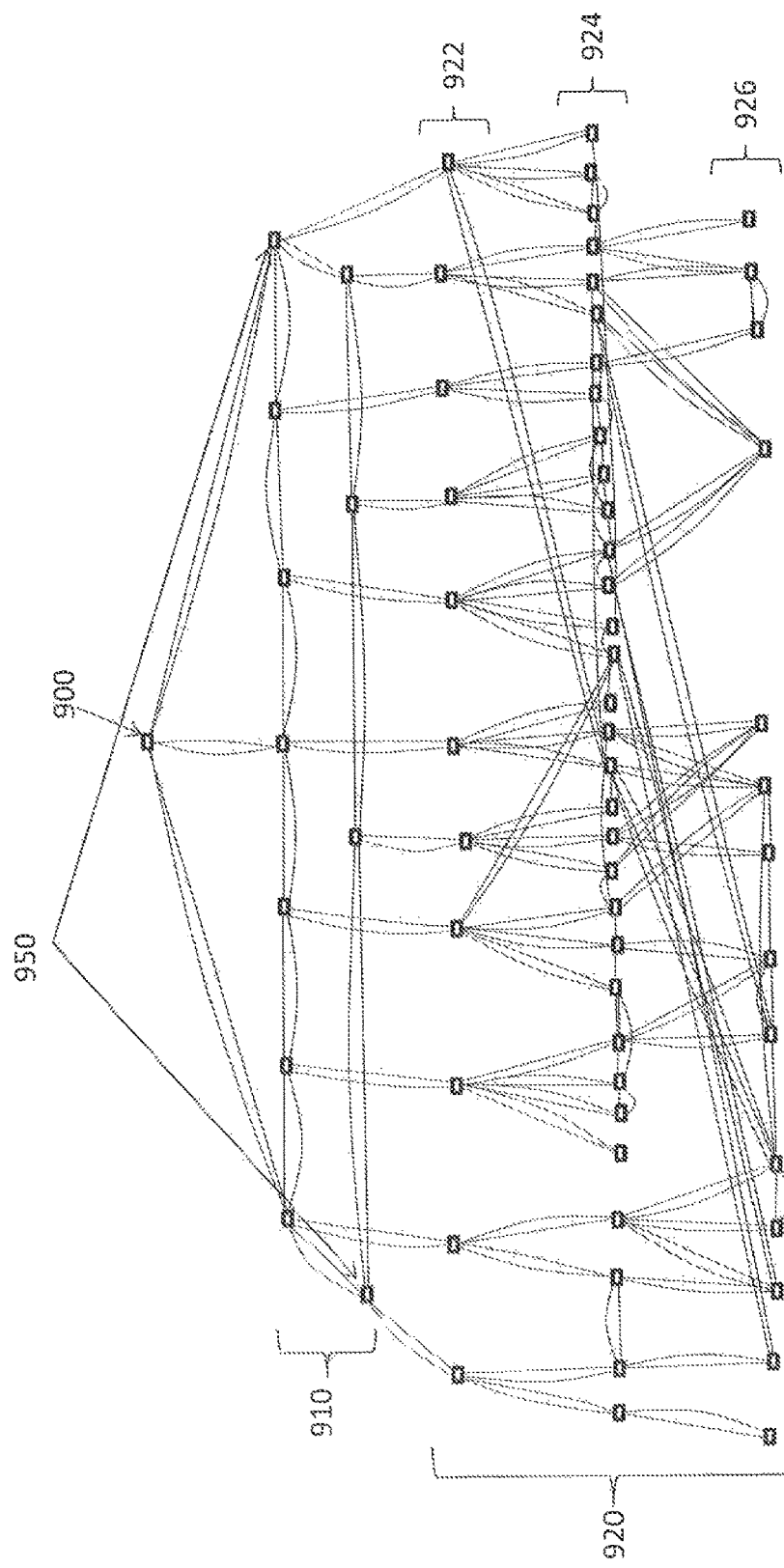
FIG. 9A illustrates cache locations determined for a given network topology using an exhaustive search approach.
Figure 9B:
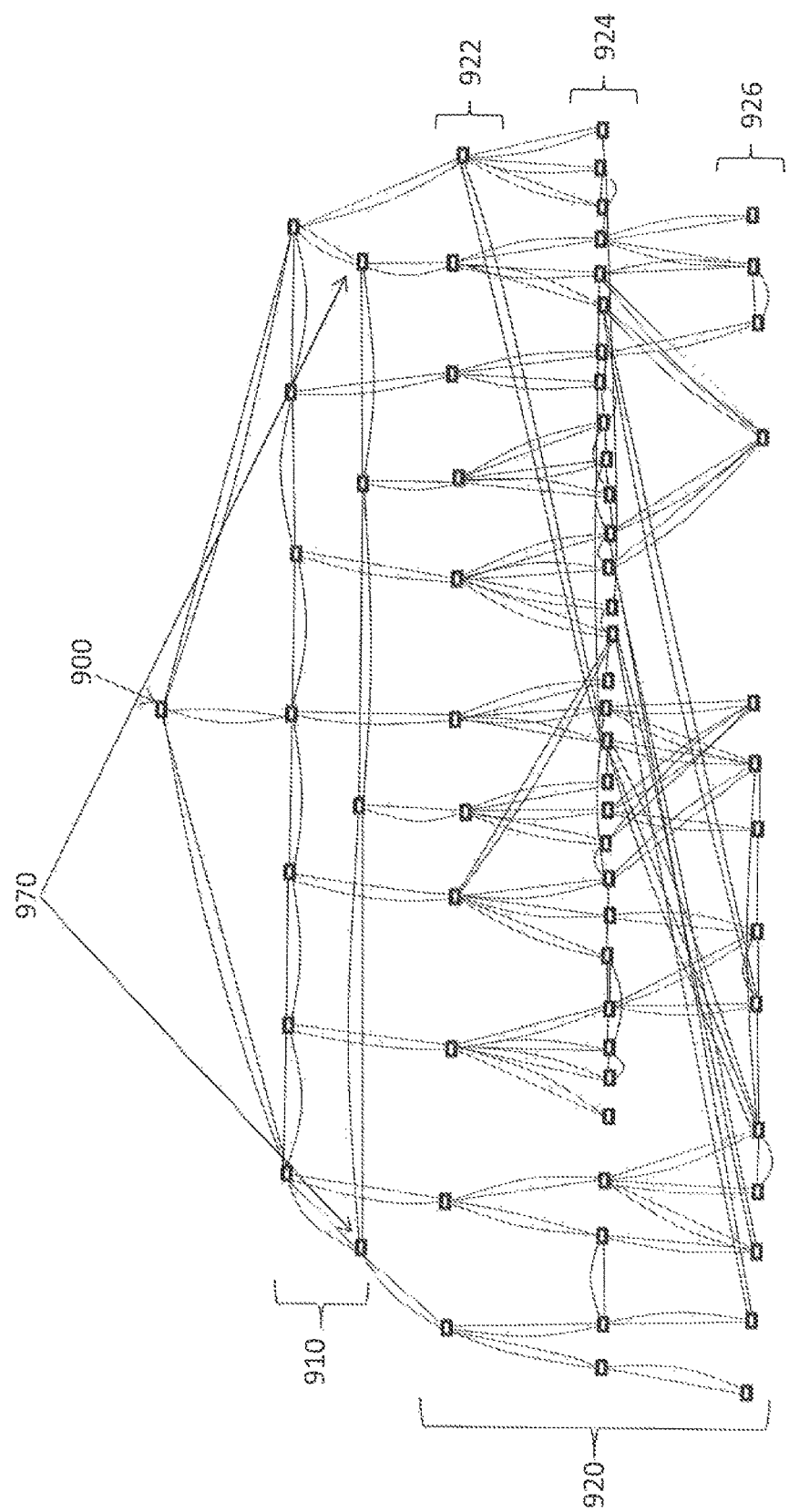
FIG. 9B illustrates cache locations determined for the given network topology in accordance with an embodiment of the present invention.

FIGS. 9A and 9B illustrate an example network topology used for simulations that were performed in accordance with embodiments of the present invention. The network includes a gateway 900, 11 core routers 910, and 57 RAN routers 920. Three core routers are connected to the gateway and are connected to each other in a ring. There are three tiers of RAN routers. The first RAN tier 922 has 11 nodes connected to 11 core routers. The second RAN tier 924 has 32 nodes, connected to 11 routers of the first RAN tier. The third RAN tier 926 has 14 nodes.

FIG. 9A illustrates cache locations 950 determined using an exhaustive search approach in which all possible cache locations are considered and an optimal solution is determined. FIG. 9B illustrates cache locations 970 determined using a decremental search approach version of the procedure of FIG. 3.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A method for providing a plurality of network caches in a communication network, the method comprising:

obtaining, by a cache placement controller: one or more parameters from a Traffic Engineering function of the communication network; a delay threshold; and a plurality of client device locations, wherein the Traffic Engineering function is operated at a different network node from the cache placement controller and is configured to perform path selection and data rate control for data links between potential cache locations and client devices at the plurality of client device locations, said one or more parameters from the Traffic Engineering function dependent on said path selection and data rate control;

determining, by the cache placement controller, a plurality of nodes of the communication network at which to place the plurality of network caches, the determining comprising evaluating and satisfying a content coverage constraint, the content coverage constraint defined based at least in part on the one or more parameters obtained from the Traffic Engineering function;

wherein the coverage content constraint limits a maximum delay across the plurality of client device locations by providing a guarantee that the maximum delay will be less than a given amount, and wherein satisfying the content coverage constraint comprises selecting the plurality of nodes such that, for each one of the plurality of client device locations and for a predetermined number c of the plurality of nodes, a corresponding output value of a coverage cost function is less than or equal to the delay threshold, the corresponding output value of the coverage cost function is determined based on a first input indicative of said one of the plurality of client device locations and a second input indicative of a location of one of the plurality of nodes and the coverage cost function is indicative of data propagation delay between locations received as input; and transmitting, by the cache placement controller to one or more other devices in the communication network, one or more instructions specifying the determined plurality of nodes for placement of the plurality of network caches.

2. The method of claim 1, wherein the predetermined number c is equal to one.

3. The method of claim 1, wherein the delay threshold depends at least in part on a type of data content to be held in the plurality of network caches.

4. The method of claim 1, further comprising generating multiple candidate sets of nodes, each candidate set of nodes having more than one node and being a candidate for the determined plurality of nodes, each candidate set of nodes satisfying the content coverage constraint, wherein generating the multiple candidate sets of nodes comprises generating a first one of the candidate sets of nodes, and modifying the first one of the candidate sets of nodes by addition or removal of one or more individual nodes belonging to the first one of the candidate sets of nodes to generate a second one of the candidate sets of nodes, and wherein determining the plurality of nodes comprises selecting one the candidate sets of nodes.

5. The method of claim 4, wherein at least one of the plurality of candidate sets of nodes other than an initial candidate set of nodes is generated by removal of at least one node from a previously generated one of the candidate sets of nodes, wherein said at least one node is selected from a plurality of non-critical nodes, wherein the plurality of non-critical nodes correspond to nodes which are removable while retaining satisfaction of the content coverage constraint.

6. The method of claim 5, wherein said at least one node is selected further based on a service rating indicative of an expected count of client devices, in the plurality of client device locations, which would be served by a cache located at said at least one node.

7. The method of claim 1, wherein determining the plurality of nodes further comprises selecting one of a plurality of candidate sets of nodes based at least in part on a predetermined utility criterion, each of the plurality of candidate sets of nodes satisfying the content coverage constraint and including more than one of the nodes of the communication network.

8. The method of claim 7, wherein the utility criterion is defined based at least partially on one or more of: network characteristics; network topology; network throughput; network load; and cache deployment costs.

9. The method of claim 7, wherein the utility criterion is defined based at least partially on a service rating applied to specified nodes of the plurality of nodes, the service rating indicative of an expected count of client devices, in the plurality of client device locations, which would be served by a cache located at each one of the specified nodes.

10. The method of claim 1, further comprising generating a plurality of cache-client associations, each of the cache-client associations directing a respective client device in one of the plurality of client device locations to use a particular non-zero subset of the plurality of network caches.

11. The method of claim 1, wherein one or both of the delay threshold and the cost coverage function are: generated by the cache placement controller; obtained from the Traffic Engineering function of the communication network, or obtained from a computer memory location accessible by the cache placement controller.

12. The method of claim 1, wherein the predetermined number c is greater than one.

13. The method of claim 1, wherein the coverage cost function is determined based at least in part on the one or more parameters obtained from the Traffic Engineering function.

14. A cache placement controller configured to direct provision of a plurality of network caches in a communication network, the cache placement controller comprising a network interface, a microprocessor, and a memory component and configured to:

obtain, using the network interface: one or more parameters from a Traffic Engineering function of the communication network; a delay threshold; and a plurality of client device locations, wherein the Traffic Engineering function is operated at a different network node from the cache placement controller and is configured to perform path selection and data rate control for data links between potential cache locations and client devices at the plurality of client device locations, said one or more parameters from the Traffic Engineering function dependent on said path selection and data rate control;

determine a plurality of nodes of the communication network at which to place the plurality of network caches, the determining comprising evaluating and satisfying a content coverage constraint, the content coverage constraint defined based at least in part on the one or more parameters obtained from the Traffic Engineering function;

wherein the coverage content constraint limits a maximum delay across the plurality of client device locations by providing a guarantee that the maximum delay will be less than a given amount, and wherein satisfying the coverage content constraint comprises selecting the plurality of nodes such that, for each one of the plurality of client device locations and for a predetermined number c of the plurality of nodes, a corresponding output value of a coverage cost function is less than or equal to the delay threshold, the corresponding output value of the coverage cost function is determined based on a first input indicative of said one of the plurality of client device locations and a second input indicative of a location of one of the plurality of nodes and the coverage cost function is indicative of data propagation delay between locations received as input; and provide, using the network interface, instructions for execution by the network to locate the plurality of network caches at the respective plurality of nodes.

15. The cache placement controller of claim 14, wherein the predetermined number c is equal to one.

16. The cache placement controller of claim 14, wherein the delay threshold depends at least in part on a type of data content to be held in the plurality of network caches.

17. The cache placement controller of claim 14, further configured to generate multiple candidate nodes, each candidate set of nodes having more than one node and being a candidate for the determined plurality of nodes, each candidate set of nodes satisfying the content coverage constraint, wherein generating the multiple candidate sets of nodes comprises generating a first one of the candidate sets of nodes, and modifying the first one of the candidate sets of nodes by addition or removal of one or more individual nodes belonging to the first one of the candidate sets of nodes to generate a second one of the candidate sets of nodes, and wherein determining the plurality of nodes comprises selecting one of the candidate sets of nodes.

18. The cache placement controller of claim 14, wherein determining the plurality of nodes further comprises selecting one a plurality of candidate sets of nodes based at least in part on a predetermined utility criterion, each of the plurality of candidate sets of nodes comprising more than one of the nodes of the communication network and each of the plurality of candidate sets of nodes satisfying the content coverage constraint.

19. The cache placement controller of claim 14, further configured to generate a plurality of cache-client associations, each of the cache-client associations directing a respective client device in one of the plurality of client device locations to use a particular non-zero subset of the plurality of network caches.

20. The cache placement controller of claim 14, wherein one or both of the cost threshold and the cost coverage function are: generated by the cache placement controller; obtained from the Traffic Engineering function of the communication network, or obtained from a computer memory location accessible by the cache placement controller.

21. The cache placement controller of claim 14, wherein the predetermined number c is greater than one.

22. The cache placement controller of claim 14, wherein the coverage cost function is determined based at least in part on the one or more parameters obtained from the Traffic Engineering function.

* * * * *